US010731546B2

(12) United States Patent
McHenry et al.

(10) Patent No.: US 10,731,546 B2
(45) Date of Patent: Aug. 4, 2020

(54) DIFFUSER IN WASTEGATE TURBINE HOUSINGS

(71) Applicant: BorgWarner Inc., Auburn Hills, MI (US)

(72) Inventors: Joseph P. McHenry, Arden, NC (US); Daniel M. Olin, Dryden, NY (US); Charles J. Kurle, Fletcher, NC (US); Gordon C. Jenks, Hendersonville, NC (US); Robert M. Wallace, Candler, NC (US)

(73) Assignee: BORGWARNER INC., Auburn Hills, MI (US)

( * ) Notice: Subject to any disclaimer, the term of this patent is extended or adjusted under 35 U.S.C. 154(b) by 569 days.

(21) Appl. No.: 15/425,134

(22) Filed: Feb. 6, 2017

(65) Prior Publication Data
US 2018/0223725 A1    Aug. 9, 2018

(51) Int. Cl.
*F02B 37/18*    (2006.01)
*F01D 5/04*    (2006.01)
(Continued)

(52) U.S. Cl.
CPC .............. *F02B 37/18* (2013.01); *F01D 5/043* (2013.01); *F01D 17/105* (2013.01); *F01D 25/24* (2013.01);
(Continued)

(58) Field of Classification Search
CPC .. F02B 37/18; F02C 6/12; F01D 5/043; F01D 25/24; F01D 17/105; F05D 2230/10; F05D 2260/606; F05D 2220/04; Y02T 10/144
See application file for complete search history.

(56) References Cited

U.S. PATENT DOCUMENTS

| 4,530,640 | A |   | 7/1985 | MacInnes |
| 5,246,335 | A | * | 9/1993 | Mitsubori ........... F04D 29/4213 415/214.1 |

(Continued)

FOREIGN PATENT DOCUMENTS

| DE |     19708000 A1 |  9/1997 |
| DE | 102013006369 A1 | 10/2014 |

(Continued)

OTHER PUBLICATIONS

Extended European Search Report dated Sep. 12, 2018, Application No. 18155219.1-1006/3358148; Applicant: BorgWarner Inc.; 9 pages.

*Primary Examiner* — David Hamaoui
(74) *Attorney, Agent, or Firm* — Young Basile Hanlin & MacFarlane, P.C.

(57) ABSTRACT

A number of variations may include a turbine housing comprising a turbine body; an inlet passage and an outlet passage connected to the turbine body; a wastegate passage operatively connected to the outlet passage; a diffuser positioned within the outlet passage comprising at least one radial opening; wherein the first flow passage accepts fluid flow from the wastegate passage and the second flow passage accepts fluid flow from the turbine wheel; wherein a first end of the diffuser is attached to a first end of the turbine outlet and a second end of the diffuser is attached to a second end of the turbine outlet so that fluid flow from the first flow passage is directed into the second flow passage through the at least one radial opening before exiting the outlet passage, and wherein the at least one radial opening minimizes turbulence of fluid flow exiting the turbine housing.

4 Claims, 3 Drawing Sheets

(51) Int. Cl.
  *F02C 6/12* (2006.01)
  *F01D 17/10* (2006.01)
  *F01D 25/24* (2006.01)

(52) U.S. Cl.
  CPC ............ *F02C 6/12* (2013.01); *F05D 2220/40* (2013.01); *F05D 2230/10* (2013.01); *F05D 2260/606* (2013.01); *Y02T 10/144* (2013.01)

(56) References Cited

U.S. PATENT DOCUMENTS

| | | | |
|---|---|---|---|
| 5,579,643 A * | 12/1996 | McEwen | F02B 37/025 |
| | | | 415/151 |
| 5,584,181 A | 12/1996 | Jinnouchi | |
| 5,857,337 A * | 1/1999 | Kawasaki | F02B 37/183 |
| | | | 60/602 |
| 5,964,574 A * | 10/1999 | Meier | F01D 9/045 |
| | | | 415/110 |
| 6,202,413 B1 * | 3/2001 | Baker | F01N 5/04 |
| | | | 415/145 |
| 6,978,615 B2 | 12/2005 | Jones et al. | |
| 8,266,906 B2 | 9/2012 | Wu et al. | |
| 8,353,664 B2 | 1/2013 | Lombard et al. | |
| 8,632,304 B2 | 1/2014 | Sweetland et al. | |
| 8,764,376 B2 | 7/2014 | Lei et al. | |
| 9,689,397 B2 * | 6/2017 | Edwards | F02B 37/00 |
| 10,233,779 B2 * | 3/2019 | Wilkins | F01D 25/24 |
| 2011/0268559 A1 | 11/2011 | Lombard et al. | |
| 2015/0240656 A1 * | 8/2015 | Ehrhard | F01D 17/105 |
| | | | 415/145 |
| 2018/0023459 A1 * | 1/2018 | Sauerstein | F02B 37/18 |
| | | | 415/145 |
| 2018/0238383 A1 * | 8/2018 | Nambu | F01D 9/02 |

FOREIGN PATENT DOCUMENTS

| | | |
|---|---|---|
| EP | 20040015180 A2 | 3/1991 |
| EP | 1574681 A1 | 9/2005 |
| EP | 2898218 A1 | 7/2015 |
| GB | 2312930 A | 11/1997 |
| JP | H07139364 A | 5/1995 |
| WO | 2011002732 A2 | 1/2011 |
| WO | 2011053513 A2 | 5/2011 |
| WO | 2016126623 A1 | 8/2016 |

* cited by examiner

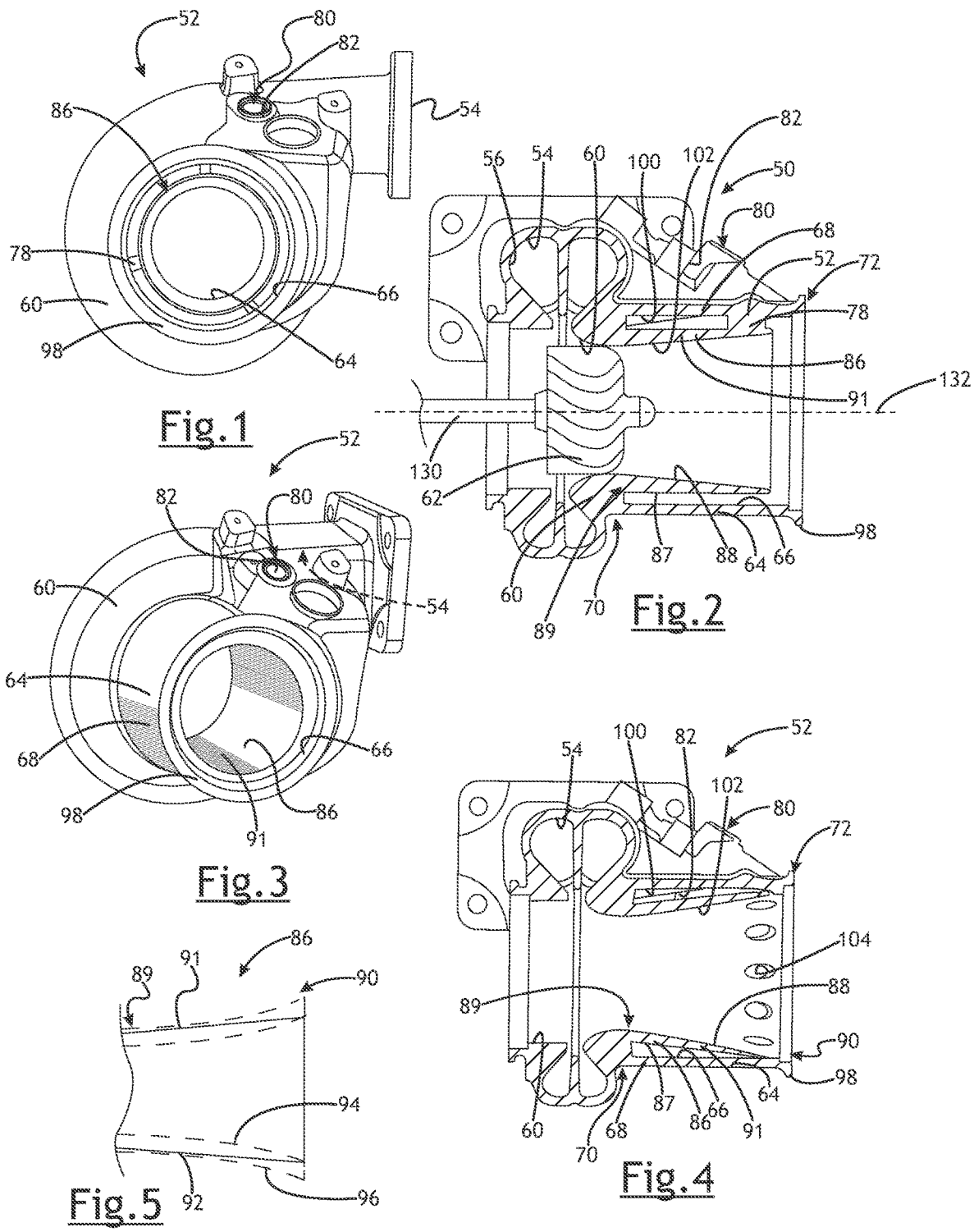

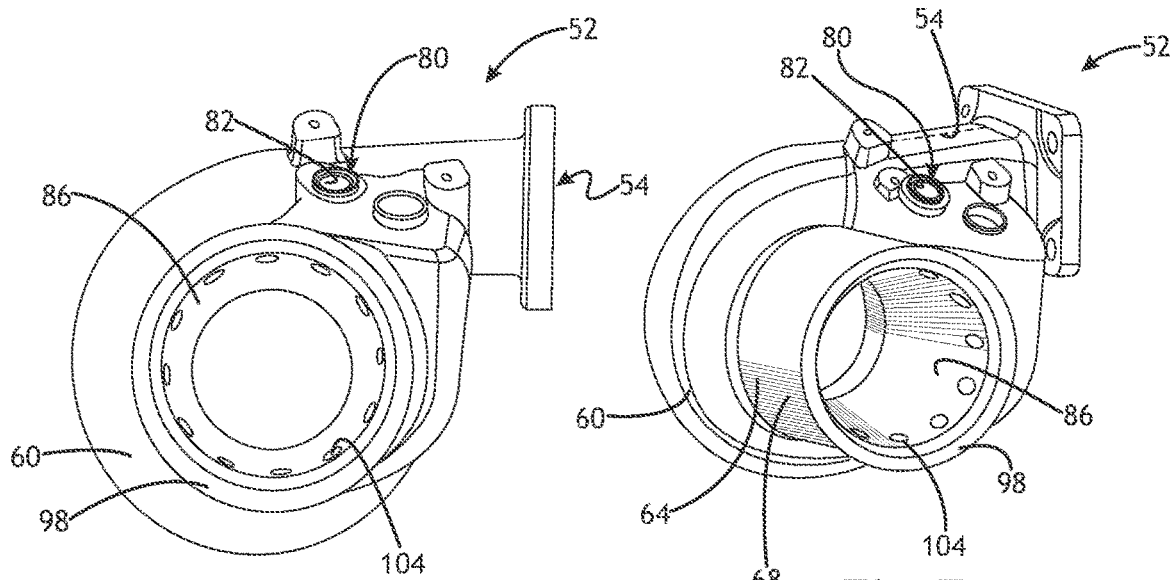
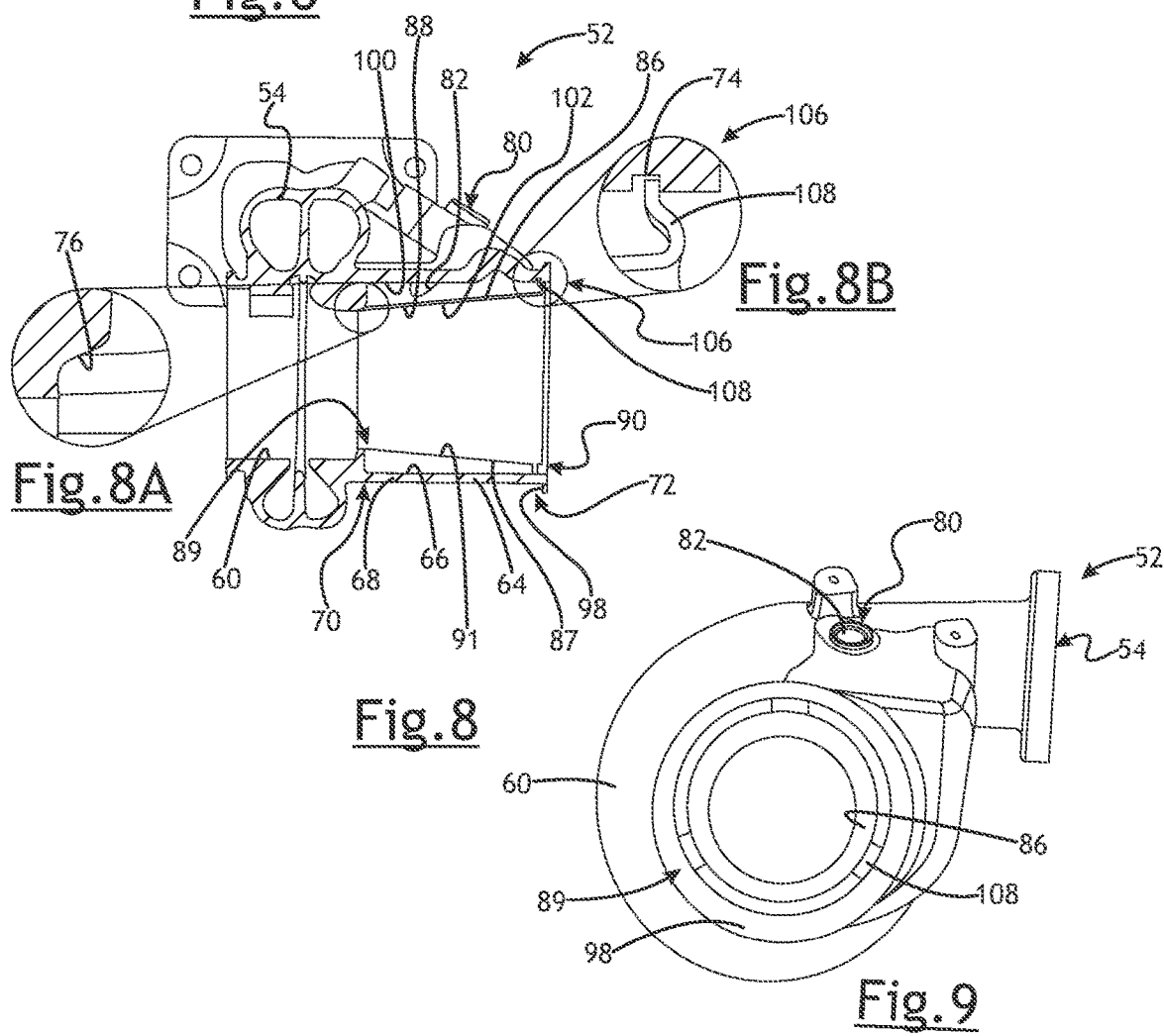

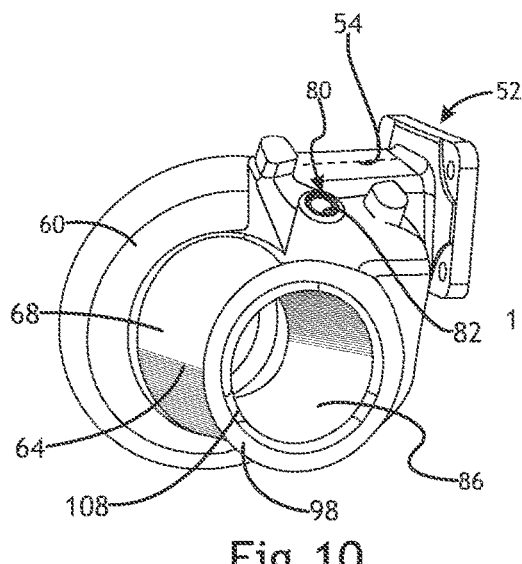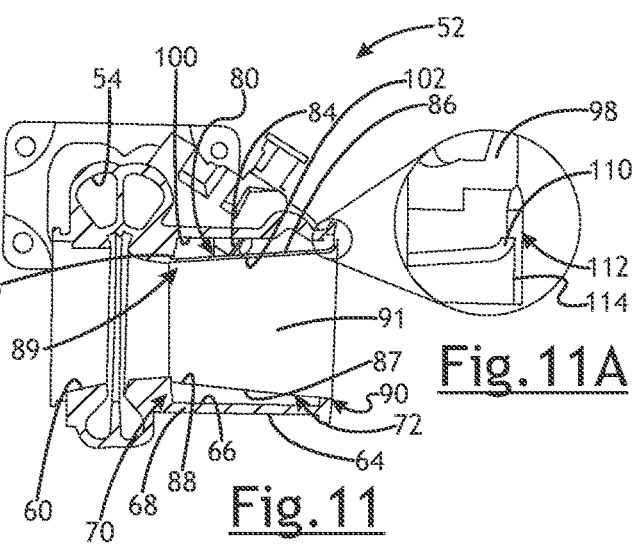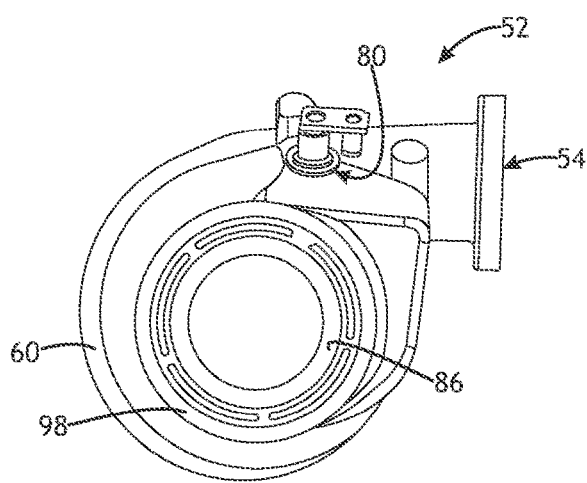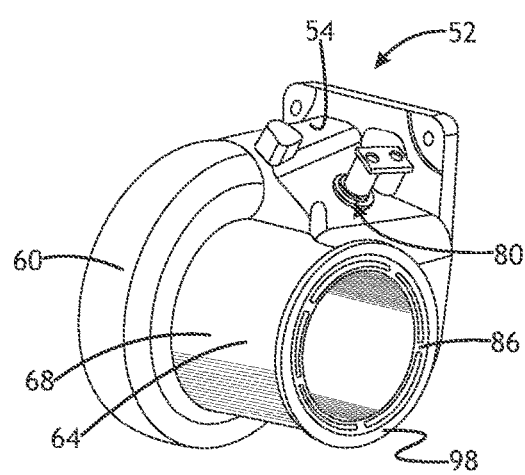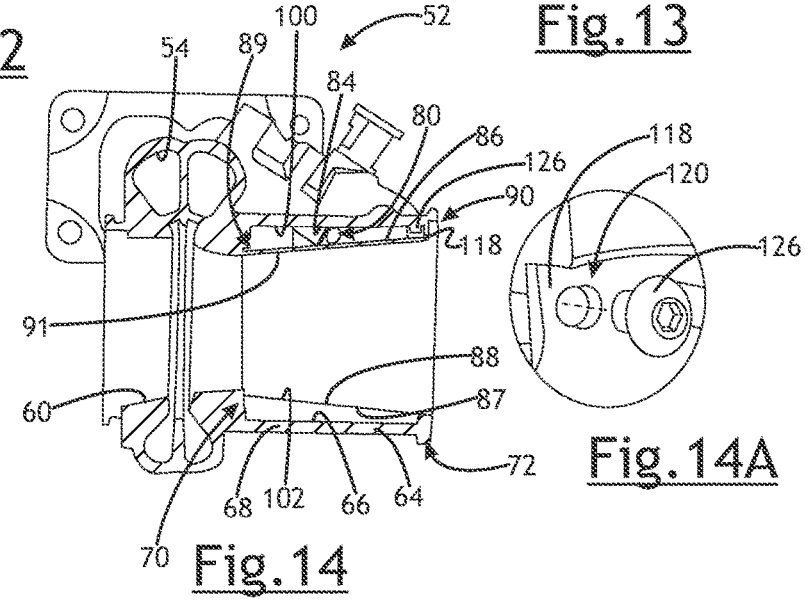

DIFFUSER IN WASTEGATE TURBINE HOUSINGS

TECHNICAL FIELD

The field to which the disclosure generally relates to includes turbochargers.

BACKGROUND

A turbocharger may include a turbine.

SUMMARY OF ILLUSTRATIVE VARIATIONS

A number of variations may include a turbine housing comprising: a turbine body constructed and arranged to house a turbine wheel; an inlet passage connected to the turbine body constructed and arranged to direct fluid flow into the turbine body; an outlet passage connected to the turbine body constructed and arranged to direct fluid flow out of the turbine housing; a wastegate passage operatively connected to the outlet passage constructed and arranged to direct fluid flow from a wastegate; a diffuser positioned within the outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser, wherein the diffuser includes at least one radial opening defined by a surface of the diffuser; wherein the first flow passage is constructed and arranged to accept fluid flow from the wastegate passage and the second flow passage is constructed and arranged to accept fluid flow from the turbine wheel; and wherein a first end of the diffuser is attached to a first end of the turbine outlet and a second end of the diffuser is attached to a second end of the turbine outlet so that fluid flow from the first flow passage is directed into the second flow passage through the at least one radial opening before exiting the outlet passage, and wherein the at least one radial opening is constructed and arranged to minimize turbulence of the fluid flow exiting the turbine housing.

A number of variations may include a product comprising: a turbine housing comprising a body constructed and arranged to house a turbine wheel; an inlet passage connected to the body constructed and arranged to direct fluid flow into the body to drive the turbine wheel; an outlet passage connected to the body constructed and arranged to direct fluid flow out of the turbine housing; and a wastegate passage extending between the inlet passage and the outlet passage; a diffuser positioned within the outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser; wherein the first flow passage is constructed and arranged to accept fluid flow from the wastegate passage and the second flow passage is constructed and arranged to accept fluid flow from the turbine wheel to minimize turbulence; and wherein the diffuser is attached to the turbine housing, and wherein the attachment between the diffuser and the turbine housing is constructed and arranged to allow for variances in thermal growth between the diffuser and the turbine housing.

A number of variations may include a method comprising: fabricating a turbine housing comprising a body constructed and arranged to house a turbine wheel; an inlet passage connected to the body constructed and arranged to direct fluid flow into the body; an outlet passage connected to the body constructed and arranged to direct fluid flow out of the turbine housing; drilling a wastegate passage between the inlet passage and the outlet passage of the turbine housing; and attaching a diffuser within the outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a back view of a turbine housing with a diffuser according to a number of variations.

FIG. 2 illustrates a section view of a turbine with a diffuser according to a number of variations.

FIG. 3 illustrates an ISO view of a turbine housing with a diffuser according to a number of variations.

FIG. 4 illustrates a section view of a turbine housing with a diffuser according to a number of variations.

FIG. 5 illustrates various profiles of a diffuser according to a number of variations.

FIG. 6 illustrates a back view of a turbine housing with a diffuser according to a number of variations.

FIG. 7 illustrates an ISO view of a turbine housing with a diffuser according to a number of variations.

FIG. 8 illustrates a section view of a turbine housing with the diffuser according to a number of variations.

FIG. 8A illustrates a close-up section view of the turbine housing with the diffuser of FIG. 8.

FIG. 8B illustrates a close-up section view of the turbine housing with a diffuser of FIG. 8.

FIG. 9 illustrates a back view of a turbine housing with a diffuser according to a number of variations.

FIG. 10 illustrates an ISO view of a turbine housing with a diffuser according to a number of variations.

FIG. 11 illustrates a section view of a turbine housing with a diffuser according to a number of variations.

FIG. 11A illustrates a close-up section view of the turbine housing with the diffuser of FIG. 11.

FIG. 12 illustrates a back view of a turbine housing with a diffuser according to a number of variations.

FIG. 13 illustrates an ISO view of a turbine housing with a diffuser according to a number of variations.

FIG. 14 illustrates a section view of a turbine housing with a diffuser according to a number of variations.

FIG. 14A illustrates a close-up section view of the turbine housing with the diffuser of FIG. 14.

DETAILED DESCRIPTION OF ILLUSTRATIVE VARIATIONS

The following description of the variations is merely illustrative in nature and is in no way intended to limit the scope of the invention, its application, or uses.

In a number of variations, an engine breathing system may include a turbocharger. The turbocharger may include a turbine which may be operatively attached to a compressor via a shaft. The turbine may be driven by exhaust gas fluid-flow which may cause the shaft to rotate which may then drive the compressor. The compressor may then pressurize air which may enter the internal combustion engine.

Referring to FIG. 2, in a number of variations, a turbine 50 may include a turbine housing 52 having an inlet passage 54 defined by an inner surface 56 of the housing 52, a body 60 which may house a turbine wheel 62, and an outlet passage 64 defined by an inner surface 66 of a cylindrical wall 68 in the turbine housing 52. The outlet passage 64 may include a first end 70 which may be adjacent the entrance of the outlet passage 64 and a second end 72 which may be adjacent the exit of the outlet passage 64. The turbine housing 52 may be constructed and arranged to direct exhaust gas through the inlet passage 54 into the turbine body 60 driving the turbine wheel 62, and out of the turbine housing 52 through the outlet passage 64. The turbine 50 may also include a wastegate passage 82 which may be constructed and arranged to circumvent exhaust gas away from the turbine wheel 62 and to the turbine outlet passage 64. The wastegate 80 may regulate the pressure at which the exhaust gases may pass through the turbine 50 from the wastegate passage 82 through opening and/or closing of a wastegate valve 84 (a variation of which is illustrated in FIG. 11). The wastegate valve 84 may be operatively attached to an actuation device (not illustrated) which may be used to control the position of the wastegate valve 84.

Referring to FIGS. 1-14A, in a number of variations, a diffuser 86 may be located within the turbine housing outlet passage 64 and may be constructed and arranged to separate gas flow coming from the turbine wheel 62 and the wastegate passage 82. The diffuser 86 may be constructed and arranged so that gases may exit the turbine 50 in the same direction through the two separate exit passages 100, 102 in the turbine 50 which may minimize turbulence of the fluid flow coming out of the turbine 50. The diffuser 86 may also diffuse the flow of gases from the turbine wheel 62 prior to and/or during the merging of the gas flow from the wastegate valve 84. The use of a diffuser 86 in the turbine outlet passage 64 may improve the fluid outflow behavior of the turbine 50 when the wastegate valve 84 may be closed, and may also improve outflow from a downstream catalytic converter when the wastegate valve 84 may be open.

Referring to FIGS. 2, 4, 11, and 14, in a number of variations, the diffuser 86 may be a cylindrical tube which may include a body 91, a first end 89, a second end 90, an outer surface 87, and an inner surface 88. The diffuser 86 may have a constant diameter from the first end 89 to the second end 90, may have a diameter that widens as it extends from the first end 89 to the second end 90, or may have a diameter which tapers as it extends from the first end 89 to the second end 90. Referring to FIG. 5, the profile of the diffuser 86 may be any number of configurations including, but not limited to, linear 92, convex 94, or may have a compound profile 96. The diffuser 86 may be any number of lengths depending on design parameters. The length of the diffuser 86 is illustrated as extending within the length of the turbine outlet passage 64 for illustrative purposes only, however, it is noted that the diffuser 86 may extend a distance past the mating exhaust flange 98 on the turbine housing 52 without departing from the spirit and scope of the invention.

In a number of variations, the diffuser 86 may be constructed and arranged to form a first flow passage 100 which may surround a second flow passage 102. The first flow passage 100 may be defined by the inner surface 66 of the outlet passage 64 and the outer surface 87 of the diffuser 86 and the second flow passage 102 may be defined by the inner surface 88 of the diffuser 86. The first flow passage 100 may be constructed and arranged to accept fluid flow from the wastegate 80 and the second flow passage 102 may be constructed and arranged to accept fluid flow from the turbine wheel 62.

Referring to FIGS. 1-4, and 6-7, the diffuser 86 may be one single and continuous unit with the turbine housing 52 so that it may be self-supported in the turbine 50. The diffuser 86 may be cast with the turbine outlet passage 64 so that the diffuser 86 is one piece with the turbine housing 52. In a number of variations, casting the diffuser 86 as a single piece with the turbine housing 52 may reduce or prevent vibrations of the diffuser 86 when fluid from the first flow passage 100 and the second flow passage 102 may combine together as compared to designs with multiple components connected together. The diffuser 86 may be concentric to the turbine outlet passage 64, a variation of which is illustrated in FIG. 2, may be biased to one side of the turbine outlet 64, or may be skewed from the turbine outlet 64, depending on design requirements. The first end 89 of the diffuser 86 may be attached to the first end 70 of the turbine outlet passage 64 so that the diffuser 86 may be cantilevered from the first end 70 of the turbine outlet passage 64. Alternately, the second end 90 of the diffuser 86 may be attached to a second end 72 of the turbine outlet passage 64 so that the diffuser 86 may be cantilevered from the second end 72 of the turbine outlet passage 64 towards the inlet passage 54 but so that it may not touch it nominally. In a number of variations, the first and/or second end 89, 90 may also be attached to the first and/or second end 70, 72 of the turbine housing outlet passage 64 by one or more radial walls or ribs 78, a variation of which is illustrated in FIGS. 1-2. The term "radial" used above and hereafter refers to a direction which extends from or is substantially perpendicular to the axis of rotation 132 of the turbocharger shaft 130, a variation of which is illustrated in FIG. 2, and the term "axial" as used hereafter refers to a direction along or substantially parallel to the axis of rotation 132 of the turbocharger shaft 130.

Referring to FIGS. 4 and 6-7, in a number of variations, the diffuser 86 may include one or more exit ports 104 which may extend through the body 91 of the diffuser 86 so that gases from the first flow passage 100 may be directed into the second flow passage 102 before exiting the turbine 50. The one or more exit ports 104 may be any number of configurations including, but not limited to, circular, oval, square, rectangular, or triangular. In a number of variations, if more than one exit ports 104 are present, the exit ports 104 may be spaced radially from each other in a predetermined pattern, may be aligned with one another, or may be randomly spaced depending on design requirements. The one or more exit ports 104 may be located adjacent the second end 90 of the diffuser 86. In a number of variations, the exit ports 104 may be constructed and arranged to reduce turbulence of the flow of gases exiting the turbine 50. In a number of variations, the exit ports 104 may be constructed and arranged to create a controlled swirl or an anti-swirl of the fluids exiting the turbine 50.

Referring to FIGS. 8-14A, in a number of variations, the turbine housing 52 and the diffuser 86 may comprise two or more components and may be constructed and arranged to allow for variances in thermal growth between the turbine housing 52 and the diffuser 86. The use of a separate diffuser 86 may allow for a wastegate passage 82 to be drilled into the housing 52 after the housing 52 is fabricated, as the diffuser 86 may be inserted into the housing 52 after the wastegate passage 82 is drilled. In a number of variations, the wastegate passage 82 may be drilled perpendicularly through a surface of the housing 52.

Referring to FIGS. 8-10, in a number of variations, the diffuser 86 may include a self-retaining snap feature 106 which may lock the diffuser 86 in the turbine housing 52. The diffuser 86 may include one or more radial lips 108 which may extend outward from the second end 90 of the diffuser 86 and which may be constructed and arranged to snap into one or more radial grooves or channels 74 in a first end 70 of the turbine outlet passage 64, a variation of which is illustrated in FIG. 8B, which may lock the diffuser 86 in place within the turbine housing outlet passage 64. A first end 70 of the turbine housing outlet passage 64 and/or body 60 may be constructed and arranged to form a seat 76 for the first end 89 of the diffuser 86 so that the first end 89 of the diffuser 86 may be radially supported by the turbine housing 52. The seat 76 may be any number of configurations to accommodate the first end 89 of the diffuser 86 including, but not limited to, conical. The arrangement of the second end 90 of the diffuser 86 being snapped within the turbine housing 52 and the first end 89 of the diffuser 86 seated within the turbine housing 52 may allow for variances in thermal growth between the turbine housing 52 and the diffuser 86.

Referring to FIGS. 11-13, in a number of variations, the diffuser 86 may be constructed and arranged so that the second end 90 may include a radial lip 110 having a cone-disc spring or Belleville spring feature 112. The exhaust flange 98 on the turbine housing 52 may be used to compress the outer edge 114 of the diffuser lip 110 against the turbine housing 52 which may hold the axial position of the diffuser 86 and may also provide a load on the diffuser lip 110 which may reduce vibration of the diffuser 86. The diffuser 86 may comprise any number of materials including, but not limited to, a thin ductile material. A first end 70 of the turbine housing outlet passage 64 and/or the turbine body 60 may be constructed and arranged to form a seat 116 for the first end 89 of the diffuser 86 so that the diffuser 86 may be radially supported by the turbine housing 52. The seat 116 may be any number of configurations to accommodate the first end 89 of the diffuser 86 including, but not limited to, conical. The joint between the first end 89 of the diffuser 86 and the seat 116 in the first end 70 of the turbine housing 52 may be coincidently and concentrically aligned. The Belleville spring feature 112 may allow for thermal growth variations between the diffuser 86 and the turbine housing 52 through changes in the spring compression. A Belleville spring configuration is discussed above for illustrative purposes, however, any number of spring methods known to those skilled in the art may be used without departing from the spirit and scope of the invention.

Referring to FIGS. 14-14A, in a number of variations, the diffuser 86 may be fastened to the turbine housing 52 via one or more mechanical fasteners 126 including, but not limited to, a bolt, which may allow for a slip joint between the diffuser 86 and the turbine housing 52. The diffuser 86 may include a radial lip 118 which may extend outward from the second end 90 of the diffuser 86. One or more holes 120 may extend axially through the radial lip 118 and may be constructed and arranged to allow a small clearance between the mechanical fastener 126 and the diffuser 86 which may prevent rotation/backing out of the mechanical fastener 126. The one or more holes 120 may be threaded to accommodate the one or more mechanical fasteners 126. The slip joint may allow for axial movement of the diffuser 86 while providing radial support which may manage stresses resulting from thermal growth gradients.

It is noted that any of the above variations may be combined or rearranged with one another without departing from the spirit and scope of the invention.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a turbine housing comprising: a turbine body constructed and arranged to house a turbine wheel; an inlet passage connected to the turbine body constructed and arranged to direct fluid flow into the turbine body; an outlet passage connected to the turbine body constructed and arranged to direct fluid flow out of the turbine housing; a wastegate passage operatively connected to the outlet passage constructed and arranged to direct fluid flow from a wastegate; a diffuser positioned within the outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser, wherein the diffuser includes at least one radial opening defined by a surface of the diffuser; wherein the first flow passage is constructed and arranged to accept fluid flow from the wastegate passage and the second flow passage is constructed and arranged to accept fluid flow from the turbine wheel; and wherein a first end of the diffuser is attached to a first end of the turbine outlet and a second end of the diffuser is attached to a second end of the turbine outlet so that fluid flow from the first flow passage is directed into the second flow passage through the at least one radial opening before exiting the outlet passage, and wherein the at least one radial opening is constructed and arranged to minimize turbulence of the fluid flow exiting the turbine housing.

Variation 2 may include a turbine housing as set forth in Variation 1 wherein the turbine housing is a single unitary cast component so that the diffuser is self-supported in the turbine housing.

Variation 3 may include a turbine housing as set forth in any of Variations 1-2 wherein the diffuser is cantilevered from a first end of the outlet passage adjacent an entrance of the outlet passage.

Variation 4 may include a turbine housing as set forth in any of Variations 1-2 wherein the diffuser is cantilevered from a second end of the outlet passage adjacent an exit of the outlet passage.

Variation 5 may include a turbine housing as set forth in any of Variations 1-4 wherein the diffuser is further attached to the outlet passage by at least one rib.

Variation 6 may include a turbine housing as set forth in any of Variations 1-5 wherein the at least one radial opening is constructed and arranged to create a controlled swirl of the fluid flow exiting the turbine housing.

Variation 7 may include a turbine housing as set forth in any of Variations 1-5 wherein the at least one radial opening is constructed and arranged to prevent swirl of the fluid flow exiting the turbine housing.

Variation 8 may include a turbine housing as set forth in any of Variations 1-7 wherein the at least one radial opening is adjacent the second end of the diffuser adjacent an exit of the outlet passage.

Variation 9 may include a product comprising: a turbine housing comprising a body constructed and arranged to house a turbine wheel; an inlet passage connected to the body constructed and arranged to direct fluid flow into the body to drive the turbine wheel; an outlet passage connected to the body constructed and arranged to direct fluid flow out of the turbine housing; and a wastegate passage extending between the inlet passage and the outlet passage; a diffuser positioned within the outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser; wherein the first flow passage is constructed and arranged to accept fluid flow from the wastegate passage and the second flow passage is constructed and arranged to accept fluid flow from the turbine wheel to minimize turbulence; and wherein the diffuser is attached to the turbine housing, and wherein the attachment between the diffuser and the turbine housing is constructed and arranged to allow for variances in thermal growth between the diffuser and the turbine housing.

Variation 10 may include a product as set forth in Variation 9 wherein a first end of the diffuser includes one or more radial lips which extend outward from the outer surface of the diffuser; wherein an inner surface of the outlet passage includes one or more radial grooves; and wherein the one or more radial lips snap into the one or more radial grooves to lock the diffuser into place.

Variation 11 may include a product as set forth in Variation 10 wherein at least one of the outlet passage or the body is constructed and arranged to include a radial seat to support a second end of the diffuser.

Variation 12 may include a product as set forth in Variation 9 further comprising an exhaust flange surrounding a first end of the outlet passage, wherein a first end of the diffuser includes a radial lip constructed and arranged to act as a spring, and wherein the exhaust flange is constructed and arranged to compress an outer edge of the radial lip against the outlet passage to hold an axial position of the diffuser and to reduce vibrations of the diffuser.

Variation 13 may include a product as set forth in Variation 12 wherein at least one of the outlet passage or the body is constructed and arranged to include a radial seat to support a second end of the diffuser.

Variation 14 may include a product as set forth in Variation 9 wherein the diffuser is fastened to the outlet passage using one or more mechanical fasteners to form a slip joint.

Variation 15 may include a product as set forth in Variation 14 wherein at least one of the outlet passage or the body is constructed and arranged to include a radial seat to support the diffuser.

Variation 16 may include a method comprising: fabricating a turbine housing comprising a body constructed and arranged to house a turbine wheel; an inlet passage connected to the body constructed and arranged to direct fluid flow into the body; an outlet passage connected to the body constructed and arranged to direct fluid flow out of the turbine housing; drilling a wastegate passage between the inlet passage and the outlet passage of the turbine housing; and attaching a diffuser within the outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser.

The above description of select variations within the scope of the invention is merely illustrative in nature and, thus, variations or variants thereof are not to be regarded as a departure from the spirit and scope of the invention.

What is claimed is:

1. A method comprising:
   fabricating a turbine housing comprising a body constructed and arranged to house a turbine wheel; an inlet passage connected to the body constructed and arranged to direct fluid flow into the body; an outlet passage connected to the body constructed and arranged to direct fluid flow out of the turbine housing;
   drilling a wastegate passage between the inlet passage and the outlet passage of the turbine housing; and
   wherein a first end of the diffuser includes one or more radial lips which extend outward from the outer surface of the diffuser; wherein an inner surface of the outlet passage includes one or more radial grooves; and wherein the one or more radial lips snap into the one or more radial grooves to lock the diffuser into place,
   attaching a diffuser within the outlet passage comprising snapping one or more radial lips of the diffuser into one or more radial grooves or channels in a first end of the turbine outlet passage, wherein the diffuser is constructed and arranged to define a first flow passage and a second flow passage, wherein the first flow passage is defined by an inner surface of the outlet passage and an outer surface of the diffuser and the second flow passage is defined by an inner surface of the diffuser, and wherein the snapping one or more radial lips of the diffuser into one or more radial grooves or channels in a first end of the turbine outlet passage provide a diffuser to turbine housing connection that allows for variances in thermal growth between the diffuser and the turbine housing,
   where the diffuser includes at least one radial opening defined by a surface of the diffuser and extending through the body of the diffuser so that fluid flow from the first flow passage is directed to the second flow passage through the at least one radial opening before exiting the outlet passage, and wherein the at least one radial opening is adjacent the first end of the diffuser adjacent an exit of the outlet passage.

2. A method as set forth in claim 1 wherein the diffuser comprises a body and wherein one or more exit ports extend through the body.

3. A method as set forth in claim 1 wherein the attachment between the diffuser and the turbine housing is constructed and arranged to allow for variances in thermal growth between the diffuser and the turbine housing.

4. The method of claim 1 wherein at least one of the outlet passage or the body is constructed and arranged to include a radial seat to support a second end of the diffuser.

* * * * *